(12) United States Patent
Shin et al.

(10) Patent No.: US 8,435,722 B2
(45) Date of Patent: May 7, 2013

(54) METHOD FOR FABRICATING LIQUID CRYSTAL DISPLAY DEVICE

(75) Inventors: Dong-Su Shin, Gyeonggi-Do (KR); Joon-Young Yang, Gyeonggi-Do (KR); Jung-Il Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 181 days.

(21) Appl. No.: 11/639,313

(22) Filed: Dec. 15, 2006

(65) Prior Publication Data
US 2007/0154845 A1    Jul. 5, 2007

(30) Foreign Application Priority Data
Dec. 30, 2005  (KR) .................. 10-2005-0136175

(51) Int. Cl.
G03F 7/20          (2006.01)
(52) U.S. Cl.
USPC ........................................................ 430/312
(58) Field of Classification Search .................. 430/311, 430/312, 313, 319, 321
See application file for complete search history.

(56) References Cited

U.S. PATENT DOCUMENTS

| 2003/0007108 A1 * | 1/2003 | Hwang et al. ............. 349/43 |
| 2005/0185109 A1 * | 8/2005 | Rho et al. ............. 349/44 |
| 2005/0270453 A1 * | 12/2005 | Jung et al. ............. 349/114 |

FOREIGN PATENT DOCUMENTS
KR    10-1999-0026576    4/1999

* cited by examiner

*Primary Examiner* — Brittany Raymond
(74) *Attorney, Agent, or Firm* — McKenna Long & Aldridge LLP

(57) ABSTRACT

A method for fabricating a liquid crystal display includes: forming a gate electrode on a substrate; sequentially providing an insulation layer, a semiconductor layer and an etch stopper layer on the gate electrode; patterning the etch stopper layer and the semiconductor layer to form an etch stopper layer pattern and a semiconductor layer pattern; removing both side portions of the etch stopper layer pattern to expose the lower semiconductor layer pattern portion; forming a conductive layer on an entire surface of the substrate; patterning the conductive layer to form source and drain electrodes and defining a channel region; forming a passivation layer having a contact part on the entire surface of the substrate; and forming a pixel electrode connected with the drain electrode via the contact part on the passivation layer. An etch stopper can be used without additionally performing a masking process.

4 Claims, 7 Drawing Sheets

METHOD FOR FABRICATING LIQUID CRYSTAL DISPLAY DEVICE

This application claims the benefit of Korean Application No. 2005-136175, filed on Dec. 30, 2005, which is incorporated by reference for all purposes as if fully set forth herein.

BACKGROUND OF THE INVENTION

1. Field of the Invention

The present invention relates to a method for fabricating a liquid crystal display (LCD) device having thin film transistors and, more particularly, to a method for fabricating an LCD capable of using an etch stopper without additionally using a mask.

2. Discussion of the Related Art

Display devices, in particular, flat panel display such as a liquid crystal display (LCD), include an active element such as a thin film transistor (TFT) in each pixel so as to be driven. This type of display device driving method is generally called an active matrix driving method.

In the active matrix driving method, the active element is disposed in each of pixels arranged in a matrix form and drives each pixel.

A method for fabricating the related art active matrix type LCD will now be described with reference to FIG. 1.

Figure 1:
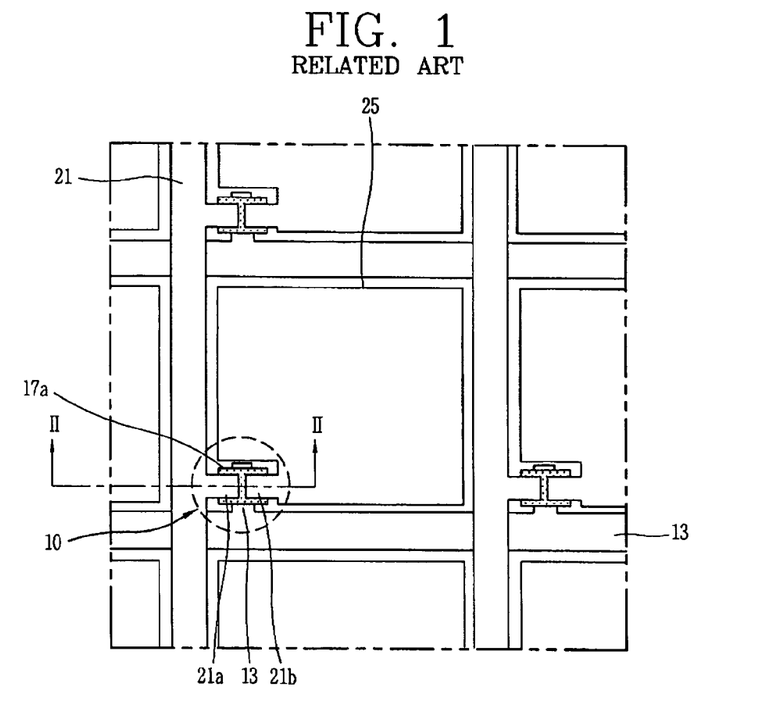
FIG. 1 is a plan view showing a unit pixel of a general liquid crystal display (LCD)

With reference to FIG. 1, the related art LCD uses TFTs 10 as active elements.

In the LCD, the N×M number of pixels are disposed horizontally and vertically on an array substrate (not shown), and each pixel includes gate lines 13 for receiving scan signals from an external driving circuit, data lines 21 for receiving image signals from an external driving circuit, and TFTs 10 formed at each crossing of the gate lines 13 and data lines 21.

Herein, the TFT 10 includes a gate electrode 13a connected with the gate line 13, a semiconductor layer pattern 17a formed on the gate electrode 13 and activated when a scan signal is applied to the gate line 13, and source and drain electrodes 21a and 21b formed on the semiconductor layer pattern 17a.

A pixel electrode 25 is formed at a display region of the pixel and connected with the source and drain electrodes 21a and 21b. When the semiconductor layer pattern 17a is activated, the pixel electrode 25 receives an image signal through the source and drain electrodes 21a and 21b to operate liquid crystal (not shown).

The structure of the related art LCD will now be described with reference to FIG. 2.

Figure 2:
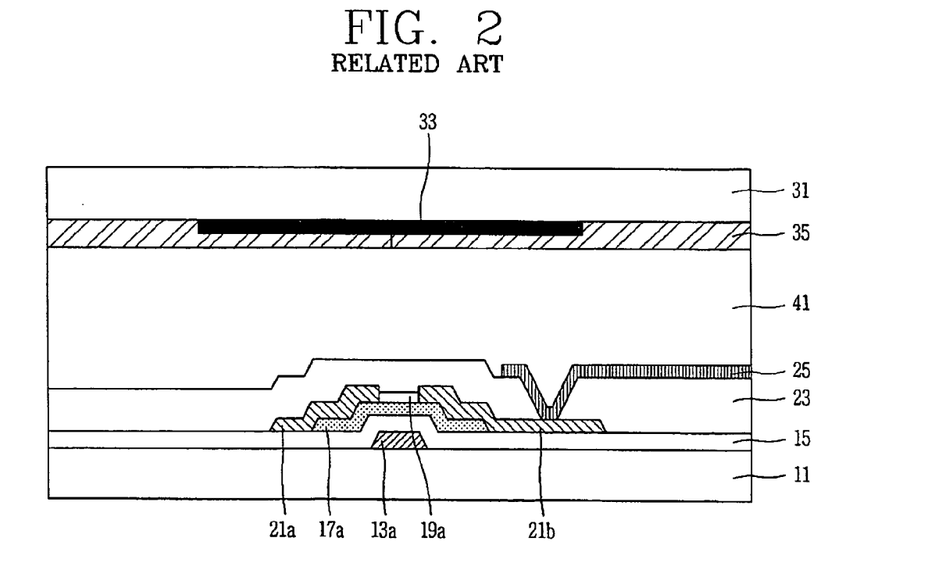
FIG. 2 is a sectional view taken along line II-II in FIG. 1 showing a section of the general LCD.

FIG. 2 is a sectional view taken along line II-II of the related art LCD in FIG. 1

With reference to FIG. 2, a TFT (10 in FIG. 1) is formed on a first substrate 11 made of a transparent material such as glass.

The TFT 10 includes a gate electrode 13a formed on the first substrate 11, a gate insulation layer 15 formed on the entire surface of the first substrate 11 with the gate electrode 13a formed thereon, a semiconductor layer pattern 17a formed on the gate insulation layer 15; an etch stopper pattern 19a formed on a channel region of the semiconductor layer pattern 17a, source and drain electrodes 21a and 21b formed on the semiconductor layer at both sides of the etch stopper pattern 19a, and a passivation layer 23 formed on the entire surface of the first substrate 11.

A pixel electrode 25 is formed on the passivation layer 23 and connected with the drain electrode 21b of the TFT 10 through a contact hole (not shown) formed in the passivation layer 23.

On the second substrate 31 made of a transparent material such as glass, there are formed a black matrix 33 at the TFT formation region or an image non-display region such as between pixels in order to prevent light transmission to the image non-display region and a color filter layer 35 including red, green and blue to implement actual colors.

To finish fabrication of the LCD, a liquid crystal layer 41 is provided between the first and second substrates 11 and 31.

The related art LCD is fabricated through a complicated process such as a photolithography which mainly uses a mask. The method for fabricating the related art LCD will now be described with reference to FIGS. 3A to 3E.

FIGS. 3A to 3E are process sectional views showing a fabrication process of the general LCD.

Figure 3A:
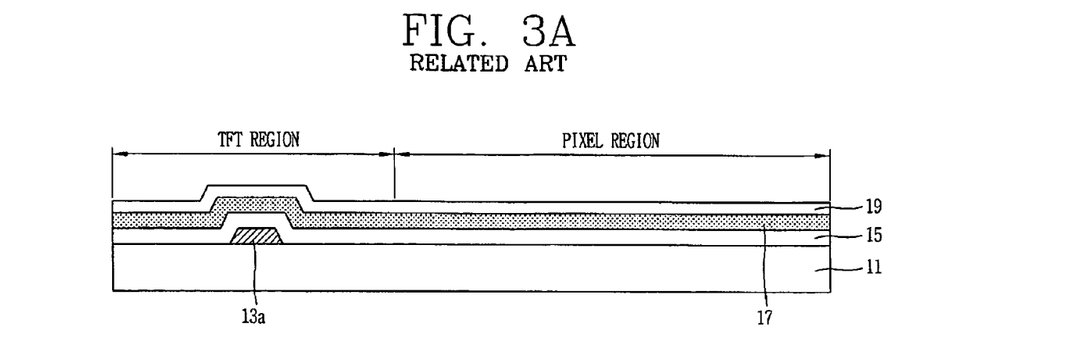
FIGS. 3A to 3E are process sectional views showing a fabrication process of the general LCD.

First, as shown in FIG. 3A, a metal is provided on the first substrate 11 to form a metallic layer (not shown), on which a first photosensitive film (not shown) is coated and baked at a certain temperature.

Next, a first mask (not shown) is positioned above the first photosensitive film through a first masking process, light such as an ultraviolet ray is irradiated onto the first photosensitive film, and a developing process is performed thereon to form a first photosensitive film pattern (not shown).

Subsequently, in a state that the metallic layer (not shown) is blocked, the first photosensitive film pattern is etched to form the gate line 13 and the gate electrode 13a extending in a vertical direction from the gate line on the first substrate 11.

Next, after the first photosensitive film pattern is removed, the gate insulation layer 15, the semiconductor layer 17 and the etch stopper 19 are sequentially formed on the entire surface of the first substrate 11 including the gate electrode 13a.

Subsequently, the second photosensitive film (not shown) is coated on the etch stopper 19, on which a second mask (not shown) is positioned, light such as ultraviolet ray is irradiated thereto, and then a developing process is performed to form a second photosensitive film pattern (not shown) through a second masking process. At this time the second photosensitive film pattern is formed only at the etch stopper 19 corresponding to a channel region of the semiconductor layer 17.

Figure 3B:
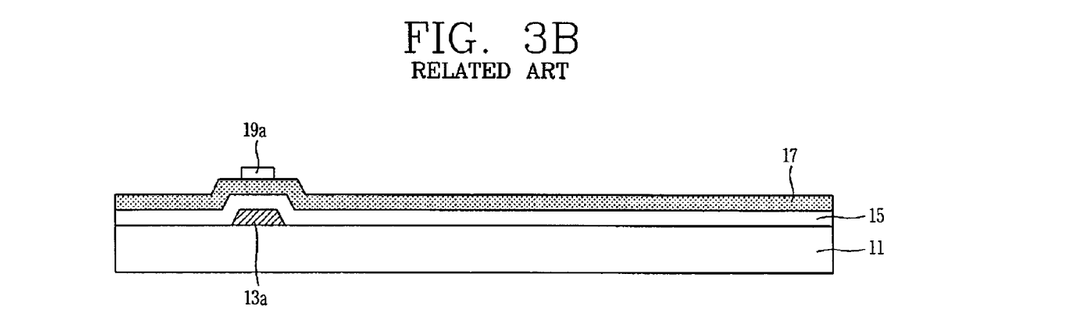

Next, as shown in FIG. 3B, when the etch stopper 19 positioned on the channel region is blocked by the second photosensitive film pattern (not shown), the etch stopper 19 is selectively etched to form an etch stopper pattern 19a.

Figure 3C:
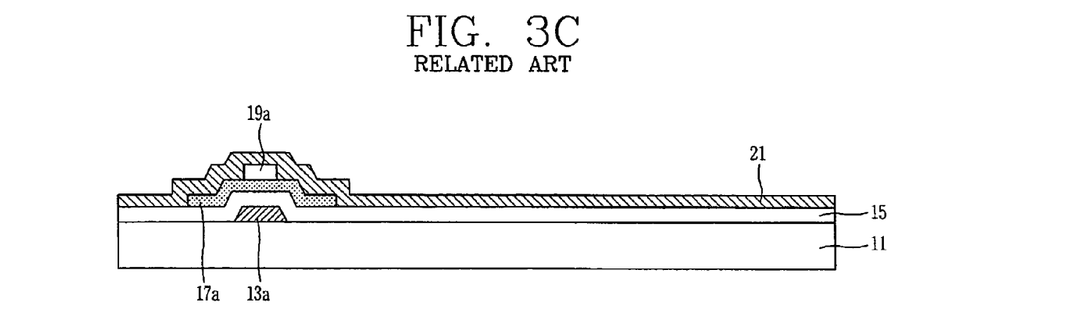

Then, as shown in FIG. 3C, after the second photosensitive film pattern is removed, an n+ a-Si:H layer (not shown) is deposited on the entire surface of the first substrate 11.

After a third photosensitive film (not shown) is coated on the n+ a-Si:H layer (not shown), a third mask is positioned at an upper position of the third photosensitive film, on which light such as an ultraviolet ray is irradiated thereto. Then, a developing process is performed to form a third photosensitive film pattern (not shown) through a third masking process.

Thereafter, in a state that a portion of the semiconductor layer 17 is blocked using the third photosensitive film pattern (not shown), the n+ a-Si:H layer and the semiconductor layer 17 are selectively etched to form an ohmic contact layer (not shown) and a semiconductor layer pattern 17a.

Subsequently, as shown in FIG. 3C, after the third photosensitive film pattern is removed, a metallic conductive material layer 21 is deposited on the entire surface of the first substrate, on which a fourth photosensitive film (not shown) is then coated.

When a fourth mask (not shown) is positioned at an upper portion of the fourth photosensitive film, light such as an ultraviolet ray is irradiated thereto, and then, a developing process is performed to form a fourth photosensitive film pattern (not shown) through a fourth masking process.

In this case, the fourth photosensitive film pattern (not shown) exists only at a region corresponding to the source/drain electrode formation region.

The fourth photosensitive film pattern (not shown) does not exist on a metallic conductive material layer region positioned at the channel region.

Figure 3D:
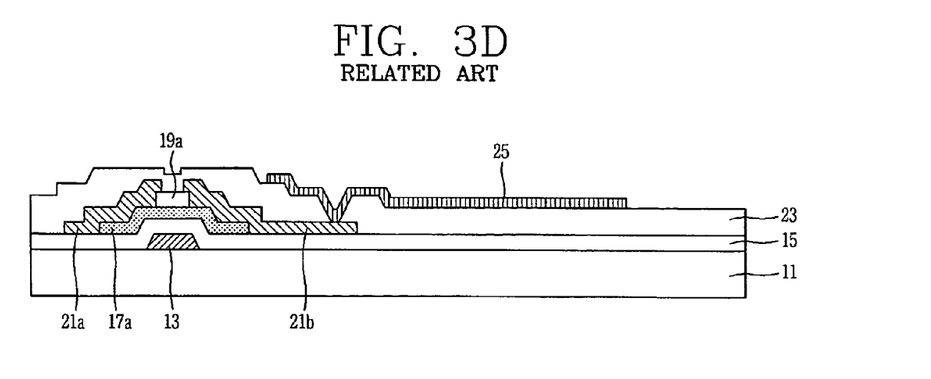

Thereafter, as shown in FIG. 3D, the metallic conductive material layer is selectively etched by using the fourth photosensitive film pattern to form the source and drain electrodes 21a and 21b.

At this time, the metallic conductive material layer positioned above the channel region is also removed, and in this case, because the etch stopper pattern 19a exists below the metallic conductive material layer, the channel cannot be damaged.

Figure 3E:
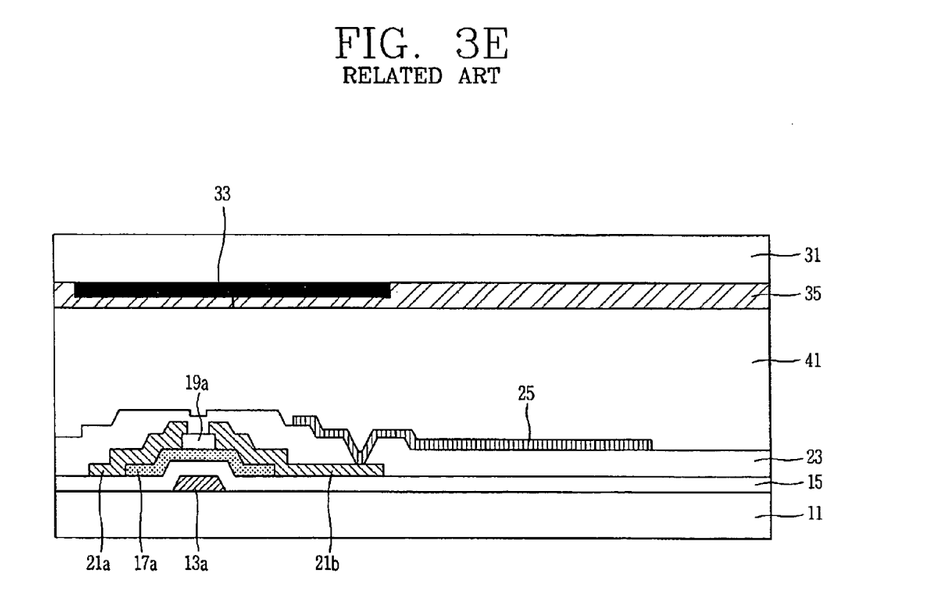

Subsequently, as shown in FIG. 3E, the fourth photosensitive film pattern (not shown) is removed, the passivation layer 23 is deposited by more than a certain thickness on the first substrate 11, on which a fifth photosensitive film (not shown) is coated.

And then, when a fifth mask (not shown) is positioned at an upper portion of the fifth photosensitive film, light such as an ultraviolet ray is irradiated thereto, and then, a developing process is performed to form a fifth photosensitive film pattern (not shown) through a fifth masking process.

Thereafter, the passivation layer 23 is selectively etched using the fifth photosensitive film pattern (not shown) to form a contact hole (not shown) exposing the drain electrode 21b.

And then, after the fifth photosensitive film pattern is removed, a transparent conductive material such as ITO is deposited on the passivation layer 23 including the contact hole (not shown).

Subsequently, when a fifth mask (not shown) is positioned at an upper portion of the transparent conductive material layer, light such as ultraviolet ray is irradiated thereto, and then a developing process is performed to form a sixth photosensitive film pattern (not shown) through a sixth masking process.

Thereafter, the transparent conductive material layer is selectively etched using the sixth photosensitive film pattern to form the pixel electrode 25 electrically connected with the drain electrode 21b, and then, the sixth photosensitive film pattern is removed.

And then, as shown in FIG. 3E, the black matrix 33 and the color filter layer 35 are formed on the second substrate 31.

The first and second substrates 11 and 12 are attached with a certain gap therebetween, into which the liquid crystal layer 41 is formed to thus finish fabrication of the LCD.

As mentioned above, the related art method for fabricating the LCD has the following problems.

That is, in the existing 5-mask structure, because the channel region of the semiconductor layer is plasma-damaged during an etching process for forming the source and drain electrodes, deteriorating the TFT characteristics, and thus, the etch stopper is used.

In this respect, however, as the etch stopper is used, the masking process is additionally performed. As a result, the number of masking processes increases, the fabrication process is complicated, and the fabrication process cost increases.

SUMMARY OF THE INVENTION

Accordingly, the present invention is directed to a method for fabricating a liquid crystal device that substantially obviates one or more of the problems due to limitations and disadvantages of the related art.

An advantage of the present invention is to provide a liquid crystal display (LCD) and a method for fabricating a liquid crystal display (LCD) by using a stopper without additionally performing a masking process in fabricating the LCD.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a method for fabricating an LCD including: forming a gate electrode on a substrate; sequentially providing an insulation layer, a semiconductor layer and an etch stopper layer on the gate electrode; patterning the etch stopper layer and the semiconductor layer to form an etch stopper layer pattern and a semiconductor layer pattern; removing both side portions of the etch stopper layer pattern to expose the lower semiconductor layer pattern; forming a conductive layer on an entire surface of the substrate; patterning the conductive layer to form source and drain electrodes and defining a channel region; forming a passivation layer having a contact part on the entire surface of the substrate; and forming a pixel electrode connected with the drain electrode via the contact part on the passivation layer.

In another aspect of the invention, there is also provided a method for fabricating an LCD including: providing first and second substrates; forming a gate electrode on the first substrate; sequentially providing an insulation layer, a semiconductor layer and an etch stopper layer on the gate electrode; patterning the etch stopper layer and the semiconductor layer to form an etch stopper layer pattern and a semiconductor layer pattern; removing both side portions of the etch stopper layer pattern to expose the lower semiconductor layer pattern part; forming a conductive layer on an entire surface of the first substrate; patterning the conductive layer to form the source and drain electrodes and defining a channel region; forming a passivation layer having a drain electrode contact part on the entire surface of the substrate; forming a pixel electrode connected with the drain electrode via the contact part on the passivation layer; providing a black matrix and a color filter layer on the second substrate; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

A method for fabricating a liquid crystal display (LCD) according to the present invention will now be described in detail with reference to FIGS. 4A to 5L.

FIGS. 4A to 4L are process sectional views showing a fabrication process of an LCD according to the present invention.

Figure 4A:
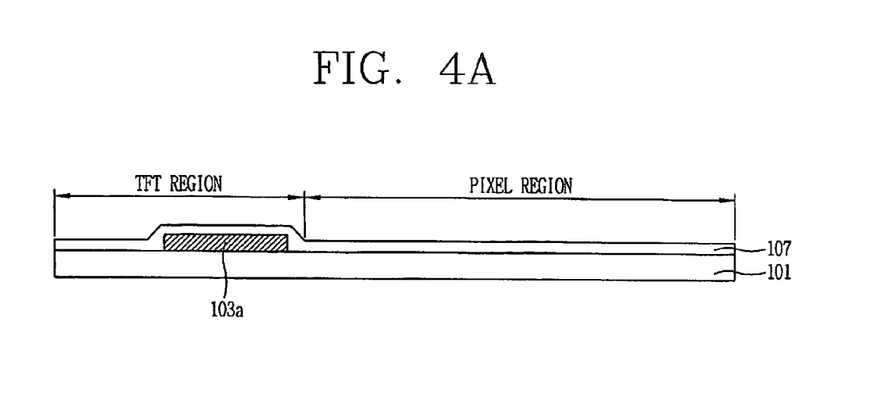
FIGS. 4A to 4L are process sectional views showing a fabrication process of an LCD according to the present invention.

As shown in FIG. 4A, a metal is provided on a first substrate 101 to form a metallic layer (not shown), on which a first photosensitive film (not shown) is coated.

Next, when the metallic layer (not shown) is blocked using the first photosensitive film pattern, an etching process is performed to form a gate line (not shown) on the first substrate 101 and a gate electrode 103a extending in a different direction from the gate line.

At this time, a lower electrode (not shown) of a capacitor is also formed when the gate electrode 103a is formed.

Next, after the first photosensitive film pattern is removed, a gate insulation layer 107 is deposited on the entire surface of the first substrate 101 including the gate electrode 103a.

Figure 4B:
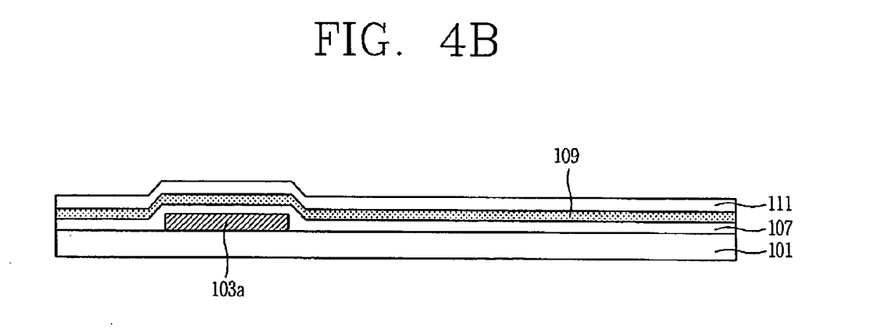

Subsequently, as shown in FIG. 4B, a semiconductor layer 109 and an etch stopper 111 are sequentially stacked on the gate insulation layer 107.

Figure 4C:
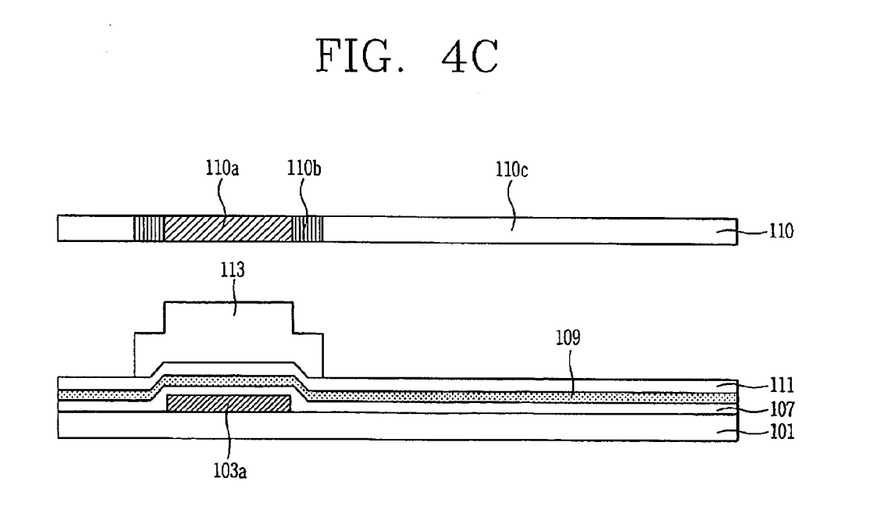

And then, as shown in FIG. 4C, a second photosensitive film (not shown) is coated on the etch stopper 111.

Thereafter, a second mask, namely, a slit (diffraction) exposure mask, is positioned at an upper portion of the second photosensitive film to perform a second masking process. In this case, the second mask 110 includes a light blocking part 110a, a light semi-transmissive part 110b and a light transmissive part 110c.

Light, such as an ultraviolet ray, is irradiated on the second photosensitive film through the second mask 110, and then, a developing process is performed to form a second photosensitive film pattern 113.

At this time, the other remaining portions except for the second photosensitive film pattern 113 part positioned below the light blocking part 110a and the semi-transmissive part of the second mask 110 are removed.

In addition, of the second photosensitive film pattern 113 positioned below the light blocking part 110a and the semi-transmissive part 110b of the second mask 110, the second photosensitive film pattern part positioned below the semi-transmissive part 110b is removed up to a certain thickness.

This is because light is not transmitted to the central portion of the second photosensitive film pattern 113 by the light blocking part 110a, while only a slight amount of light is transmitted to the second photosensitive film part below the semi-transmissive part 110b by the semi-transmissive part 110b, so the second photosensitive film part positioned below the semi-transmissive part 110b is removed up to a certain thickness.

The width of the second photosensitive film pattern 113 limits the semiconductor layer region of the LCD.

Figure 4D:
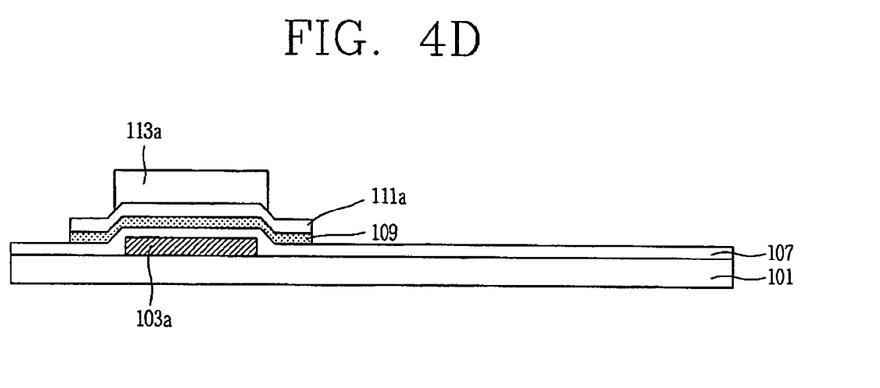

As shown in FIG. 4D, when the semiconductor layer region is blocked using the second photosensitive film pattern 113, the etch stopper 111 and the semiconductor layer 109 are etched together to form an etch stopper pattern 111a and a semiconductor layer pattern 109a.

Subsequently, the second photosensitive film pattern 113 is ashed to expose an edge portion of the etch stopper pattern 111a.

The ashing process is a process in which a gas containing reactive oxygen species is oxidated with a photosensitive film of an organic film component so as to be removed.

Through the ashing process, the central portion of the second photosensitive film pattern 113 is removed only up to a certain thickness, and both side portions of the second photosensitive film pattern 113 positioned at an edge portion of the etch stopper pattern 113a are completely removed.

Figure 4E:
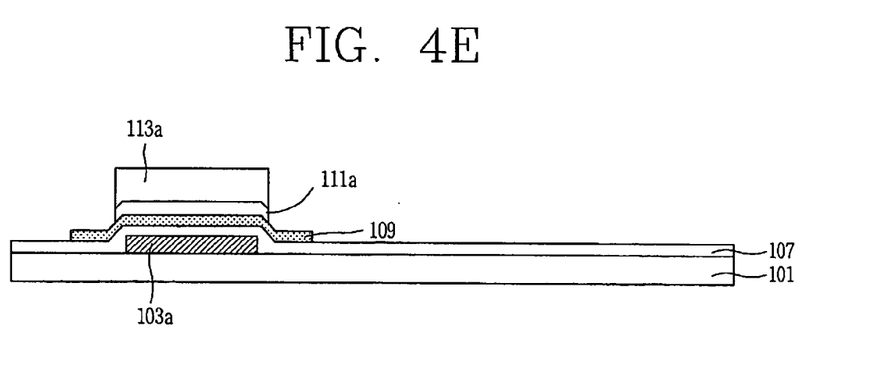
Figure 4F:
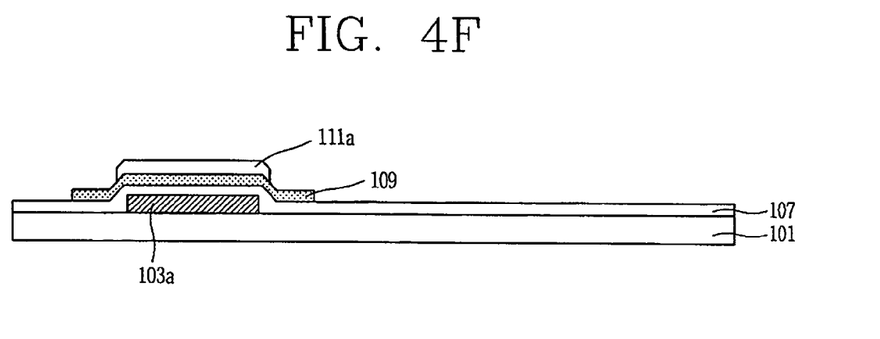

And then, as shown in FIGS. 4E and 4F, the exposed edge portion of the etch stopper pattern 111a is selectively removed using the second photosensitive film pattern 113a as a mask to partially expose the semiconductor layer pattern 109a and the second semiconductor film pattern 113a is removed.

Figure 4G:
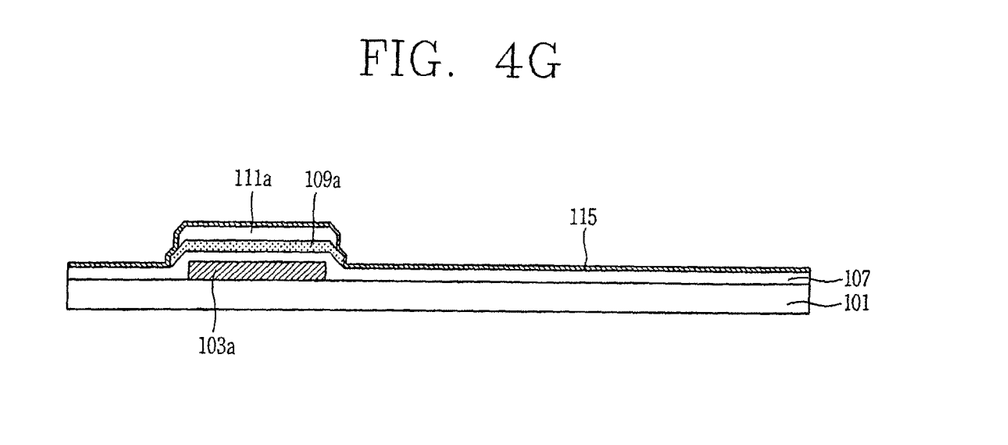

Subsequently, as shown in FIG. 4G, amorphous silicon or polysilicon in which N+ impurities are doped is deposited on the entire surface of the first substrate 101 to form an ohmic contact layer 115.

In this case, the ohmic contact layer 115 is formed for ohmic contacting between the source and drain electrodes and the active layer.

The ohmic contact layer can be formed by injecting high density impurity ions into the semiconductor layer or can be formed on the semiconductor layer by adding the high density impurity ions during a process of depositing the semiconductor layer.

Figure 4H:
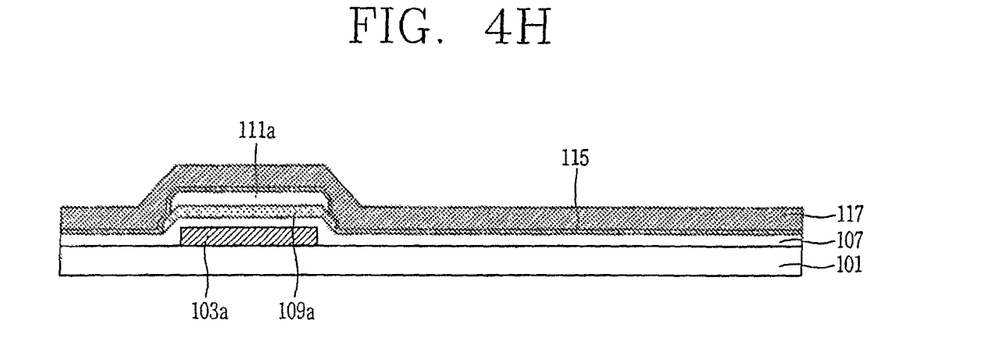

Next, as shown in FIG. 4H, a conductive material layer 117 is deposited on the entire surface of the first substrate including the ohmic contact layer 115 by using a sputtering method or other depositing methods.

Subsequently, although not shown, a third photosensitive film (not shown) is coated on the conductive material layer 117 and a third mask (not shown) is positioned at an upper portion of the third photosensitive film through a third masking process.

And then, the third photosensitive film pattern (not shown) blocks only portions of the conductive material layer 117 to be formed as source and drain electrodes.

Figure 4I:
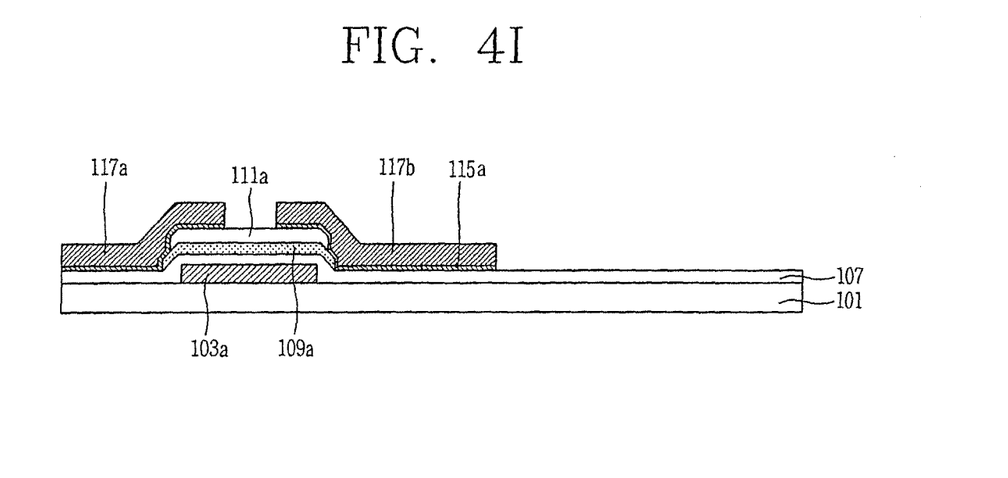

Thereafter, as shown in Fig. 4I the conductive material layer 117 and the ohmic contact layer 115 are selectively etched by using the third photosensitive film pattern (not shown) to form source and drain electrodes 117a and 117b, and an ohmic contact layer pattern 115a.

At this time, a portion of the conductive material layer 117 on the channel portion of the TFT are also removed when the conductive material layer 117 is etched.

In etching the conductive material layer 117, because there is no etch stopper pattern 111a on the channel portion of the TFT, the TFT is not damaged.

Figure 4J:
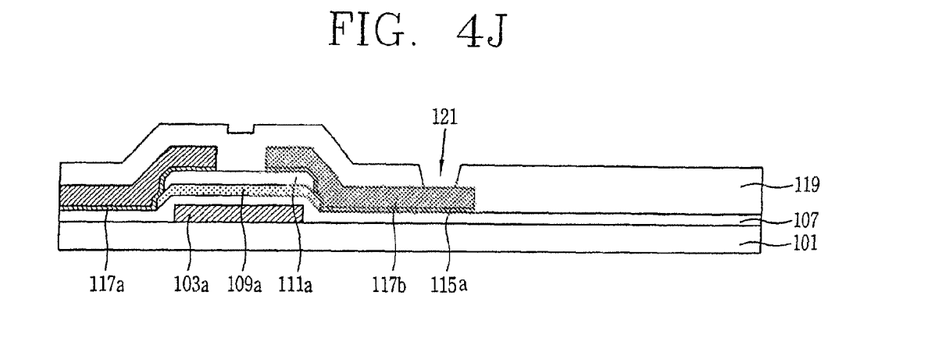

Subsequently, as shown in FIG. 4J, the third photosensitive film pattern (not shown) is removed, a passivation layer 119 is deposited by more than a certain thickness on the first substrate 101, on which a fourth photosensitive film pattern (not shown) is coated.

And then, when a fourth mask (not shown) is positioned at an upper portion of the fourth photosensitive film pattern, light such an ultraviolet ray, etc. is irradiated thereto, and then, a developing process is performed to form a fourth photosensitive film pattern (not shown) through a fourth masking process.

Thereafter, the passivation layer 119 is selectively etched by using the fourth photosensitive film pattern (not shown) to form a contact hole 121 exposing the drain electrode 117b.

And then, after the fourth photosensitive film pattern is removed, a transparent conductive material such as ITO is deposited on the passivation layer including the contact hole 121.

Subsequently, when a fifth mask (not shown) is positioned at an upper portion of the transparent conductive material layer, light such as an ultraviolet ray, etc. is irradiated thereto, and then a developing process is performed thereon to form a fifth photosensitive film pattern (not shown) through a fifth masking process.

Figure 4K:
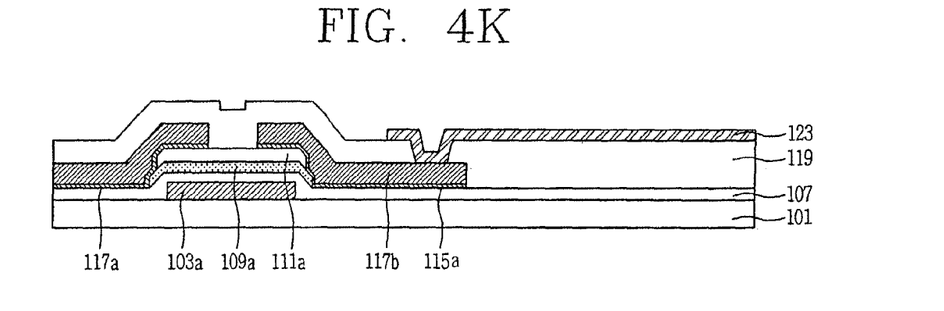

As shown in FIG. 4K, the transparent conductive material layer is selectively etched by using the fifth photosensitive film pattern as a mask to form a pixel electrode 123 electrically connected with the drain electrode 117b, and then, the fifth photosensitive film pattern is removed.

Figure 4L:
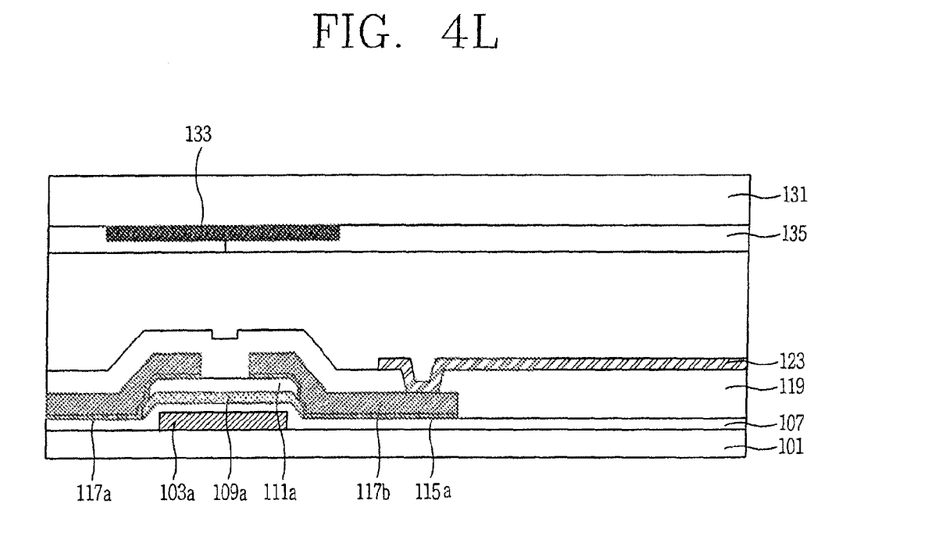

With reference to FIG. 4L, a black matrix 133 and a color filter layer 135 are sequentially formed on the second substrate 131, the first and second substrates 101 and 131 are positioned to be separated with a certain gap therebetween, and a liquid crystal layer 41 is formed between the first and second substrates 101 and 131 to thus complete an LCD.

As so far described, the method for fabricating the LCD according to the present invention has many advantages.

That is, compared with the related art in which the etch stopper is used to prevent degradation of TFT characteristics possible caused as the active region is damaged in the etching process for forming the source and the drain electrodes, so the masking process is additionally performed to pattern the etch stopper, in the present invention, the etch stopper is used without performing a masking process to fabricate the TFT.

Meanwhile, by using a contact hole filling process, a TFT using an etch stopper can be fabricated with four masks without using a slit (diffraction) exposure method.

In addition, compared with the four masks using the slit exposure, a defective active region such as a wavy noise deficiency can be prevented from occurring, and the defect resulting from the bad TFT characteristics in the related art 4 masks can be prevented by using the etch stopper.

Moreover, because the etch stopper can be used without using a masking process, a defect (e.g., a black bar mark or blur, etc.) cannot be generated.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating thin film transistor comprising:
forming a gate electrode on a substrate;
sequentially forming an insulation layer, a semiconductor layer and an etch stopper layer on the substrate including the gate electrode;
forming a photosensitive film on the etch stopper layer;
exposing the photosensitive film using a slit exposure mask, wherein the slit exposure mask includes a blocking part and a semi-transparent part adjacent to each side of the blocking part, and performing a developing process to form a photosensitive film pattern, wherein the thickness of both side portions of the photosensitive film pattern is thinner than that of a central portion of the photosensitive film pattern disposed on the etch stopper layer corresponding to the gate electrode;
etching the etch stopper layer and the semiconductor layer using the photosensitive film pattern as a mask to form a semiconductor layer pattern and an etch stopper layer pattern;
removing the side portions of the photosensitive film pattern on the etch stopper layer pattern by an ashing process to expose an edge portion of the etch stopper layer pattern, wherein a part of the central portion of the photosensitive film pattern is removed in proceeding the ashing process;
removing the exposed edge portion of the etch stopper layer pattern to expose the semiconductor layer pattern;
removing the remained photosensitive film pattern;
forming an ohmic contact layer on the entire surface of the substrate including the semiconductor layer pattern, the etch stopper layer pattern and the insulation layer;
forming a conductive layer on the ohmic contact layer;
simultaneously patterning the conductive layer and the ohmic contact layer using the same mask to form source and drain electrodes and an ohmic contact layer pattern, and defining a channel region, wherein the ohmic contact layer pattern is in contact with an entire under surface of the source and drain electrodes, and is in contact with the etch stopper layer pattern, the semiconductor layer pattern and the insulation layer;
forming a passivation layer on the entire surface of the substrate including the source and drain electrodes and the ohmic contact layer pattern, wherein the passivation layer directly contacts the ohmic contact layer pattern;
patterning the passivation layer to form a contact part exposing the drain electrode; and
forming a pixel electrode connected with the drain electrode via the contact part on the passivation layer, wherein three photosensitive films and three exposing processes are used in forming a thin film transistor.

2. The method of claim 1, wherein a first photosensitive film of the three photosensitive film is used in forming the gate electrode, a second photosensitive film is used in forming the etch stopper layer pattern and the semiconductor layer pattern, and a third photosensitive film is used in forming the ohmic contact layer pattern, the source electrode and the drain electrode.

3. A method for fabricating a liquid crystal display comprising:
providing first and second substrates;
forming a gate electrode on the first substrate;
sequentially forming an insulation layer, a semiconductor layer and an etch stopper layer on the substrate including the gate electrode;
forming a photosensitive film on the etch stopper layer;
exposing the photosensitive film using a slit exposure mask, wherein the slit exposure mask includes a blocking part and a semi-transparent part adjacent to each side of the blocking part, and performing a developing process to form a photosensitive film pattern, wherein the thickness of both side portions of the photosensitive film pattern is thinner than that of a central portion of the photosensitive film pattern disposed on the etch stopper layer corresponding to the gate electrode;
etching the etch stopper layer and the semiconductor layer using the photoresist film pattern as a mask to form a semiconductor layer pattern and an etch stopper layer pattern;
removing the side portions of the photosensitive film pattern on the etch stopper layer pattern by an ashing process to expose an edge portion of the etch stopper layer pattern, wherein a part of the central portion of the photosensitive film pattern is removed in proceeding the ashing process;

removing the exposed edge portion of the etch stopper layer to expose the semiconductor layer pattern;

removing the remained photosensitive film pattern;

forming an ohmic contact layer on the entire surface of the substrate including the semiconductor layer pattern, the etch stopper layer pattern and the insulation layer;

forming a conductive layer on the ohmic contact layer;

simultaneously patterning the conductive layer and the ohmic contact layer using the same mask to form source and drain electrodes and an ohmic contact layer pattern, and define a channel region, wherein the ohmic contact layer pattern is in contact with an entire under surface of the source and drain electrodes, and is in contact with the etch stopper layer pattern, the semiconductor layer pattern and the insulation layer;

forming a passivation layer on the entire surface of the substrate including the source and drain electrodes and the ohmic contact layer pattern, wherein the passivation layer directly contacts the ohmic contact layer pattern;

patterning the passivation layer to form a contact part exposing the drain electrode; and forming a pixel electrode connected with the drain electrode via the contact part on the passivation layer;

providing a black matrix and a color filter layer on the second substrate; and forming a liquid crystal layer at between the first and second substrates, wherein three photosensitive films and three exposing processes are used in forming the thin film transistor.

4. The method of claim 3, wherein a first photosensitive film of the three photosensitive film is used in forming the gate electrode, a second photosensitive film is used in forming the etch stopper layer pattern and the semiconductor layer pattern, and a third photosensitive film is used in forming the ohmic contact layer pattern, the source electrode and the drain electrode.

* * * * *